United States Patent
Chen et al.

(10) Patent No.: US 9,543,826 B2
(45) Date of Patent: Jan. 10, 2017

(54) AUDIBLE NOISE AVOIDING CIRCUIT AND DC-DC BOOST CONVERTER HAVING THE SAME

(71) Applicant: ANPEC ELECTRONICS CORPORATION, Hsinchu (TW)

(72) Inventors: Chih-Yuan Chen, Hsinchu (TW); Tzu-Yang Yen, Taipei (TW)

(73) Assignee: Anpec Electronics Corporation, Hsinchu (TW)

( * ) Notice: Subject to any disclaimer, the term of this patent is extended or adjusted under 35 U.S.C. 154(b) by 0 days.

(21) Appl. No.: 14/929,678

(22) Filed: Nov. 2, 2015

(65) Prior Publication Data

US 2016/0056712 A1    Feb. 25, 2016

Related U.S. Application Data

(63) Continuation-in-part of application No. 13/968,811, filed on Aug. 16, 2013, now abandoned.

(30) Foreign Application Priority Data

Jun. 21, 2013 (TW) .............................. 102122133 U (51) Int. Cl.
*H02J 1/02* (2006.01)
*H02M 3/158* (2006.01)
*H02M 1/44* (2007.01)
*H02M 3/156* (2006.01)

(52) U.S. Cl.
CPC ............... *H02M 1/44* (2013.01); *H02M 3/156* (2013.01); *H02M 3/158* (2013.01); *H02M 3/1588* (2013.01); *Y02B 70/1466* (2013.01)

(58) Field of Classification Search
CPC ...... H02M 3/155; H02M 3/156; H02M 3/158; H02M 2001/0045; H02M 2001/0067; H02M 2001/0093; G05F 1/467; H02J 1/02
See application file for complete search history.

(56) References Cited

U.S. PATENT DOCUMENTS

| | | | |
|---|---|---|---|
| 7,495,420 B2 * | 2/2009 | Vinn | H02M 3/156 323/266 |
| 7,653,366 B2 * | 1/2010 | Grigore | H03C 5/00 323/268 |
| 9,256,238 B1 * | 2/2016 | Kotikalapoodi | G05F 1/59 |

(Continued)

*Primary Examiner* — Gary L Laxton
(74) *Attorney, Agent, or Firm* — Rosenberg, Klein & Lee (57) ABSTRACT

An audible noise avoiding circuit and a DC-DC boost converter for a DC-DC boost converter are provided. The audible noise avoiding circuit comprises a timing controller and a linear regulator. The timing controller discharges a timing capacitor to a low voltage according to switching of the DC-DC boost converter. A sink output stage of the liner regulator is coupled to the output voltage node. When the voltage of the timing capacitor is higher than a threshold voltage, the compensation unit compensates the output of the operational amplifier for gradually turning on the sink output stage in order to gradually reduce the voltage of the output voltage node. A predetermined charging time interval is defined by the time interval of charging the timing capacitor from the low voltage to the threshold voltage, the reciprocal of the predetermined time interval is a frequency in the ultrasonic wave frequency range.

16 Claims, 4 Drawing Sheets

(56) References Cited

U.S. PATENT DOCUMENTS

2014/0184173 A1* 7/2014 Szepesi ............... H02J 7/0068
320/164
2015/0155783 A1* 6/2015 Li ....................... H03F 1/0227
323/271

* cited by examiner

AUDIBLE NOISE AVOIDING CIRCUIT AND DC-DC BOOST CONVERTER HAVING THE SAME

CROSS-REFERENCE TO RELATED APPLICATIONS

This Application is a continuation-in-part of Non-provisional application Ser. No. 13/968,811 filed on Aug. 16, 2013, currently pending.

BACKGROUND

1. Technical Field

The instant disclosure relates to a DC-DC boost converter, in particular, to an audible noise avoiding circuit and a DC-DC boost converter having the same.

2. Description of Related Art

Figure 1:
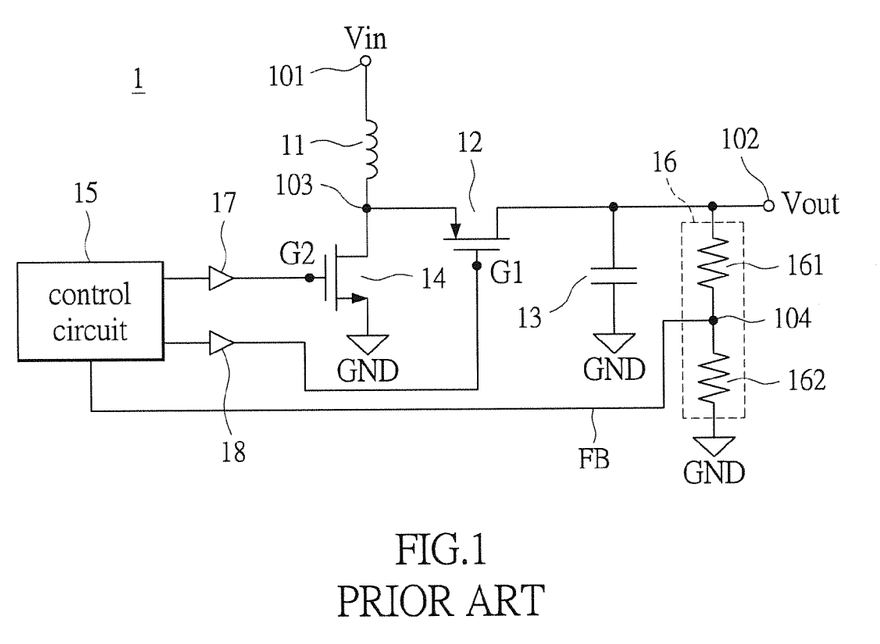
FIG. 1 is a circuit diagram of a conventional DC-DC boost converter.

Please refer to FIG. 1. FIG. 1 is a circuit diagram of a conventional DC-DC boost converter. The conventional DC-DC boost converter includes an inductor 11, a first switch 12, a capacitor 13, a second switch 14, a control circuit 15, a voltage division unit 16 and driving units 17, 18. The control circuit 15 controls the DC-DC boost converter to operate in a pulse width modulation mode (PWM mode) or a pulse frequency modulation mode (PFM mode). The pulse frequency modulation mode is suitable for the light load condition. The control circuit 15 obtains a feedback voltage FB corresponding to an output voltage Vout via a feedback node 104 of the voltage division unit 16. According to the feedback voltage FB, the control circuit 15 controls the conducting status of the first switch 12 and the second switch 14 through the driving units 17, 18 respectively to adjust the voltage level of the output voltage Vout. When the voltage level of the output voltage Vout is insufficient, the second switch 14 and the first switch 12 are sequentially switched on to make the inductor 11 charge the capacitor 13. When the voltage level of the output voltage Vout is sufficient, the second switch 14 and the first switch 12 will not be switching.

Figure 2:
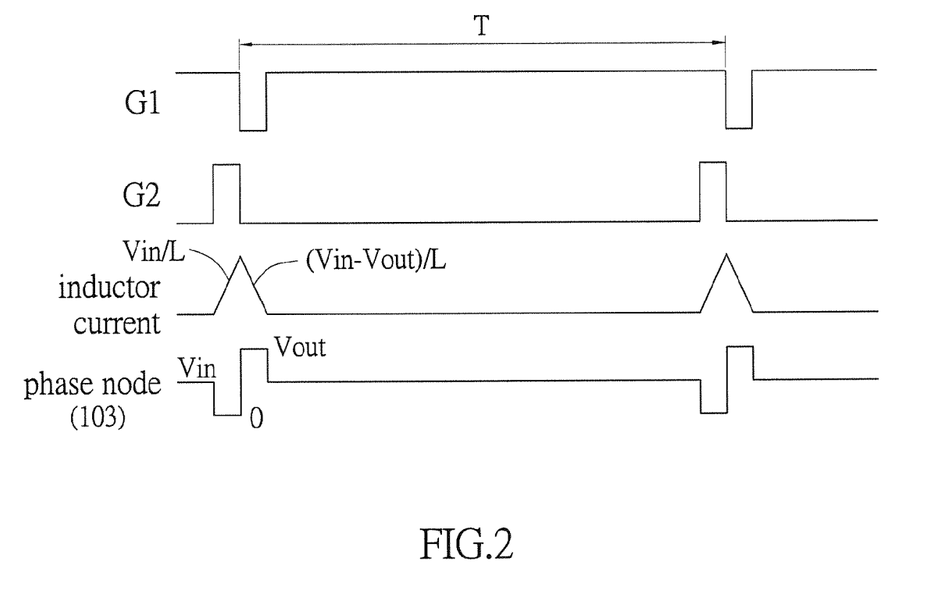
FIG. 2 is a waveform diagram of voltage and current during operation of the DC-DC boost converter shown in FIG. 1.

Please refer to FIG. 1 and FIG. 2. FIG. 2 is a waveform diagram of voltage and current during operation of the DC-DC boost converter shown in FIG. 1. When the second switch 14 is turned on due to a voltage change at a control node G2 of the second switch 14, an inductive current rises with a slope Vin/L; L is an inductance value of the inductor 11. When the second switch 14 is turned off, and the first switch 12 is turned on due to a voltage change at a control node G1 of the first switch 12, the inductive current falls with a slope (Vin-Vout)/L. It is worth mentioning that when the second switch 14 is turned on, the voltage level at a phase node 103 drops from the input voltage Vin to a voltage level close to a ground voltage (zero volts). After that when the second switch 14 is turned off and the first switch 12 is turned on, the voltage level at the phase node 103 changes from a voltage level close to the ground voltage (zero volt) to the output voltage Vout.

The switching time interval T between each switch operation (or so called driver operation) varies due to the output loading at the output voltage node 102. Each switching of the first switch 12 and the second switch 14 could introduce audio noise. The frequency of the audio noise made by the first switch 12 and the second switch 14 depends on the switching time interval T.

SUMMARY

An exemplary embodiment of the instant disclosure provides an audible noise avoiding circuit and a DC-DC boost converter having the same. The audible noise avoiding circuit gradually reduces the voltage of the output voltage node if the frequency of switching the switches of the DC-DC boost converter is in the frequency that the human ear can hear during operation of the DC-DC boost converter.

An exemplary embodiment of the instant disclosure provides an audible noise avoiding circuit used for a DC-DC boost converter having an inductor coupled between an input voltage node and a phase node, a first switch coupled between the phase node and an output voltage node, a capacitor coupled between the output voltage node and a ground and a second switch coupled between the phase node and the ground. The audible noise avoiding circuit comprises a timing controller and a linear regulator. The timing controller has a timing capacitor charged by a current source. The timing controller is coupled to the first control node and the second control node. The timing controller discharges the timing capacitor to a low voltage when receiving a first switching signal controlling the first switch and a second switching signal controlling the second switch. The linear regulator has a sink output stage, a compensation unit and an operational amplifier. The sink output stage is coupled to the output voltage node. An inverted input terminal of the operational amplifier receives a threshold voltage. A non-inverted input terminal of the operational amplifier receives the voltage of the timing capacitor. An output terminal of the operational amplifier is coupled to the compensation unit and a control terminal of the sink output stage. When the voltage of the timing capacitor is higher than the threshold voltage the operational amplifier outputs a control voltage to the compensation unit and the control terminal of the sink output stage. The compensation unit compensates the control voltage for gradually turning on the sink output stage in order to gradually reduce the voltage of the output voltage node. A predetermined charging time interval is defined by the time interval of charging the timing capacitor from the low voltage to the threshold voltage, the reciprocal of the predetermined time interval is a frequency in the ultrasonic wave frequency range.

An exemplary embodiment of the instant disclosure provides a DC-DC boost converter operating in a pulse frequency modulation mode. The DC-DC boost converter comprises an inductor, a first switch, a capacitor, a second switch, a control circuit and an audible noise avoiding circuit. The inductor is coupled between an input voltage node and a phase node. The first switch is coupled between the phase node and an output voltage node. The capacitor is coupled between the output voltage node and a ground. The second switch is coupled between the phase node and the ground. The control circuit transmits a first switching signal to a first control node of the first switch and a second switching signal to a second control node of the second switch for controlling the conducting status of the first switch and the second switch according to a feedback voltage responding to the voltage at the output voltage node. The audible noise avoiding circuit comprises a timing controller and a linger regulator. The timing controller has a timing capacitor charged by a current source. The timing controller is coupled to the first control node and the second control node. The timing controller discharges the timing capacitor to a low voltage when receiving the first switching signal and the second switching signal. The linear regulator has a sink output stage, a compensation unit and an operational amplifier. The sink output stage is coupled to the output voltage node. An inverted input terminal of the operational amplifier receives a threshold voltage. A non-inverted input terminal of the operational amplifier receives the voltage of the timing capacitor. An output terminal of the operational amplifier is coupled to the compensation unit and a control terminal of the sink output stage. When the voltage of the timing capacitor is higher than the threshold voltage the operational amplifier outputs a control voltage to the compensation unit and the control terminal of the sink output stage. The compensation unit compensates the control voltage for gradually turning on the sink output stage in order to gradually reduce the voltage of the output voltage node. A predetermined charging time interval is defined by the time interval of charging the timing capacitor from the low voltage to the threshold voltage, the reciprocal of the predetermined time interval is a frequency in the ultrasonic wave frequency range.

To sum up, the audible noise avoiding circuit detects whether the switches of the DC-DC boost converter are switching, and performs timing control for reducing the voltage of the output voltage node. When the switches (the first switch or the second switch) of the DC-DC boost converter are not switching during the predetermined time interval, the audible noise avoiding circuit gradually reduces the voltage of the output voltage node so as to trigger the driver operation of the control circuit for turning on the first switch, in order to avoid generating the noise in the frequency that the human ear can hear during operation of the DC-DC boost converter.

In order to further understand the techniques, means and effects of the instant disclosure, the following detailed descriptions and appended drawings are hereby referred to, such that, and through which, the purposes, features and aspects of the instant disclosure can be thoroughly and concretely appreciated; however, the appended drawings are merely provided for reference and illustration, without any intention to be used for limiting the instant disclosure.

DESCRIPTION OF THE EXEMPLARY EMBODIMENTS

Figure 3:
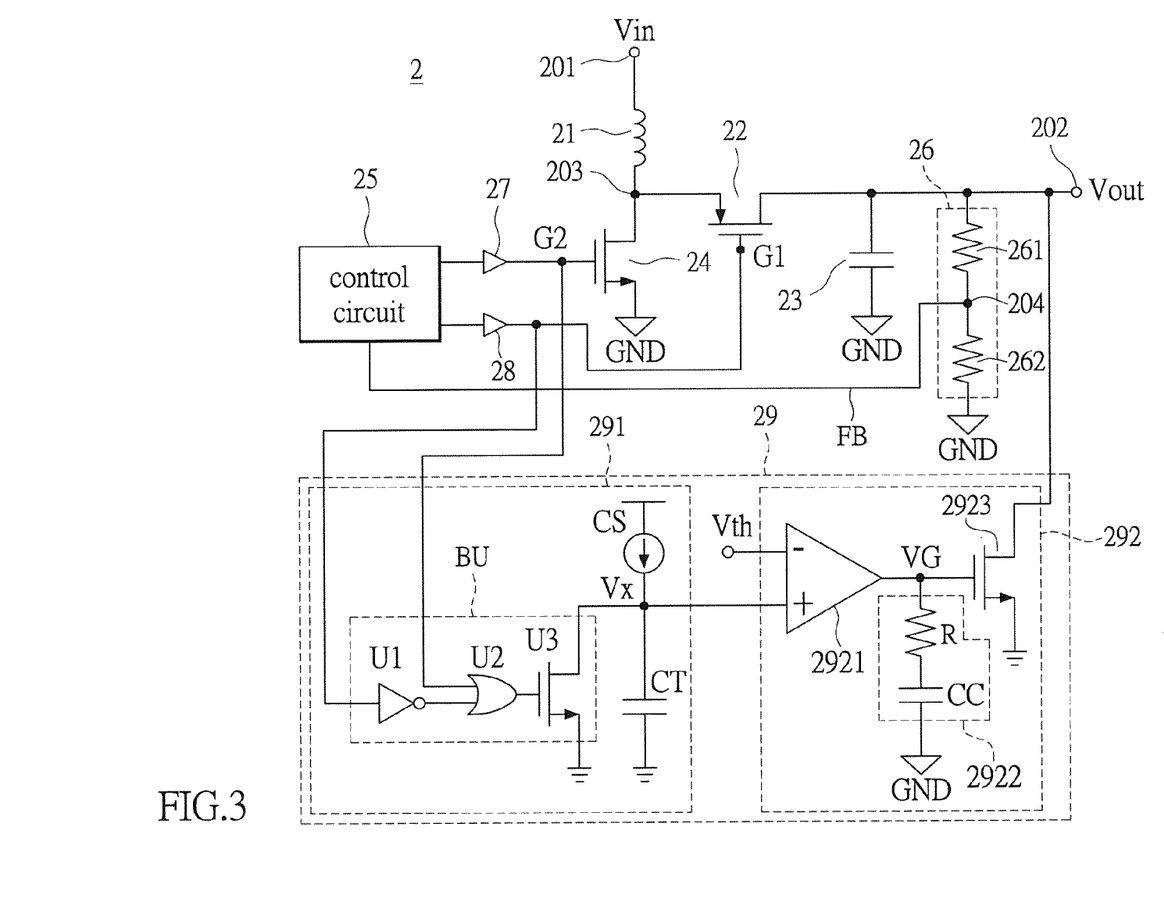
FIG. 3 is a circuit diagram of a DC-DC boost converter having an audible noise avoiding circuit in an embodiment of the instant disclosure.

Referring to FIG. 3, FIG. 3 is a circuit diagram of a DC-DC boost converter having an audible noise avoiding circuit in an embodiment of the instant disclosure. The DC-DC boost converter 2 operates in a pulse frequency modulation mode (PFM mode). The DC-DC boost converter 2 comprises an inductor 21, a first switch 22, a capacitor 23, a second switch 24, a control circuit 25, a voltage division unit 26, driving units 27, 28 and an audible noise avoiding circuit 29. The audible noise avoiding circuit 29 comprises a timing controller 291 and a linear regulator 292. The inductor 21, the first switch 22, the capacitor 23, the second switch 24, the control circuit 25, the voltage division unit 26 and the driving units 27, 28 are respectively the same to the inductor 11, the first switch 12, the capacitor 13, the second switch 14, the control circuit 15, the voltage division unit 16 the driving units 17, 18. The driving units 27, 28 are utilized to provide the second switch 24 and the first switch 22 with sufficient driving voltage. The driving units 27, 28 can change according to the type of the switches 22, 24, or can also be integrated into the control circuit 25.

The inductor 21 is coupled between an input voltage node 201 and a phase node 203. The first switch 22 is coupled between the phase node 203 and an output voltage node 202. The capacitor 23 is coupled between the phase node 203 and a ground GND. The control circuit 25 is coupled to a second control node G2 of the second switch 24 via the driving unit 27, and the control circuit 25 is coupled to a first control node G1 of the first switch 22 via the driving unit 28. The control circuit 25 is coupled to the phase node 203 in order to detect the voltage at the phase node 203. The audible noise avoiding circuit 29 is coupled to the first control node G1, the second control node G2 and the output voltage node 202. Details of the audible noise avoiding circuit 29 are further described in the instant disclosure hereinafter.

The voltage division unit 26 is used as a feedback circuit. The voltage division unit 26 is coupled to the output voltage node 202, and generates a feedback voltage FB according to a voltage Vout at the output voltage node 202. In detail, the voltage division unit 26 is composed of a resistor 261, which is coupled between an output voltage node 206 and a feedback node 204, and a resistor 262, which is coupled between the feedback node 204 and the ground GND. The voltage division unit 26 divides the voltage at the output voltage node 202 so as to generate the feedback voltage FB at the feedback node 204.

The control circuit 25 is according to the feedback voltage FB corresponding to the voltage Vout at the output voltage node 202 to control the conducting status of the first switch 22 and the second switch 24 (turning on or off). The first switch 22 is controlled by a first switching signal generated by the control circuit 25. The second switch 24 is controlled by a second switching signal generated by the control circuit 25. In this exemplary embodiment, the first switch 22 is a P-channel MOSFET (PMOS), and the second switch 24 is an N-channel MOSFET (NMOS); however, this is not a limitation in the instant disclosure. The first switch 22 or the second switch 24 can be a transistor of other type, and the type of the first switch 22 and the second switch 24 is not limited in the instant disclosure.

In this exemplary embodiment, when the first switch 22 is a P-channel MOSFET (PMOS), the first switching signal can be a low voltage pulse signal for turning on the first switch 22. That is, when the voltage level at the first control node G1 is low voltage (for example, the ground voltage), the first switch 22 would be turned on. When the second switch 24 is an N-channel MOSFET (NMOS), the second switching signal can be a high voltage pulse for turning on the second switch 24. That is, when the voltage level at the second control node G2 is high voltage (for example, the threshold voltage of the NMOS or a higher voltage), the second switch 24 would be turned on.

When the DC-DC boost converter 2 operates in the pulse frequency modulation mode (PFM), the load is light load. Because the power consumed by the load is lower (relative to operating in the pulse width modulation mode), the second switch 24 and the first switch 22 are not switching when the output voltage Vout is still sufficiently large (which can be obtained by comparing the feedback voltage FB with a reference voltage Vref in the control circuit 25). When the DC-DC boost converter 2 operates in the conventional pulse frequency modulation mode, the frequency of the switching noise will be in a frequency range the human ear can hear if the frequency corresponding to the time interval between two switches of the second switch 24 (and the first switch 22) is lower than 20 kHz. In order to resolve this issue, the audible noise avoiding circuit 29 with timing control function of the instant disclosure is utilized.

The timing controller 291 of the audible noise avoiding circuit 29 has a timing capacitor CT charged by a current source CS and a logic control unit BU. The timing controller 291 is coupled to the first control node G1 and the second control node G2 for receiving the first switching signal controlling the first switch 22 and the second switching signal controlling the second switch 24 so as to discharge the timing capacitor CT to a low voltage. The low voltage can be the ground voltage (GND) or a voltage close to the ground voltage.

Figure 4:
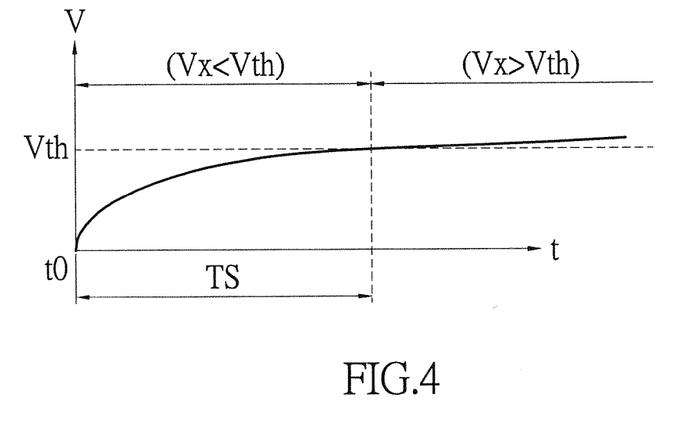
FIG. 4 is a waveform diagram of the voltage of a timing capacitor of the audible noise avoiding circuit shown in FIG. 3 when the switching frequency of the switches of the DC-DC boost converter is lower than the predetermined time interval.

The logic control unit BU is coupled to the first control node G1, the second control node G2 and the timing capacitor CT. The logic control unit BU receives the first switching signal and the second switching signal for discharging the timing capacitor CT. When any one of the first switching signal and the second switching signal is generated by the control circuit 25, the logic control unit BU would discharge the timing capacitor CT to the low voltage (for example, the ground voltage, or so called zero volt). In this embodiment, the logic control unit BU comprises a logic inverter U1, a logic OR gate U2 and a third switch U3. However, the logic control unit BU shown in FIG. 3 can be replaced by any other logic circuit with equivalent logic function. In this embodiment, the third switch U3 is N-channel MOSFET (NMOS). The logic inverter U1 receives and inverts the first switching signal. The logic OR gate U2 is coupled to the inverter U1. The logic OR gate U2 receives the first switching signal and the inverted second switching signal. The third switch is controlled by the logic OR gate U2 for discharging the timing capacitor CT. When any one of the first switching signal and the second switching signal is generated by the control circuit 25 for switching the first switch 22 or the second switch 24, the logic OR gate U2 of the logic control unit BU would output a logic high voltage to turn on the third switch U3 temporarily. As a result, the timing capacitor CT would be discharged to a low voltage level close to the ground voltage which is be the voltage between the drain electrode and the source electrode of the third switch U3. Referring to FIG. 4, the time point t0 indicates the time when the third switch U3 is turned on for discharging the timing capacitor CT to the low voltage level close to zero volt. After the time point t0, the voltage level Vx of the timing capacitor CT would increase over time, and the increase speed of the voltage level Vx of the timing capacitor CT depends on the capacitance of the timing capacitor CT. A predetermined charging time interval Ts is defined by the time interval of charging the timing capacitor CT from the low voltage (the ground voltage or a voltage near to the ground voltage) to a threshold voltage Vth. The reciprocal of the predetermined time interval Ts is a frequency in the ultrasonic wave frequency range. The voltage Vx of the timing capacitor CT would still increase until any one of the first switching signal and the second switching signal is generated again. The frequency range that the human ear can hear is generally between 20 Hz and 20 kHz.

The frequency corresponding to the predetermined time interval Ts is in the ultrasonic wave frequency range (e.g., greater than 20 kHz). For example, the predetermined time interval Ts is set to 32 μsec. The frequency corresponding to 32 μsec is approximately 31 kHz, which the human ear cannot hear.

Figure 5:
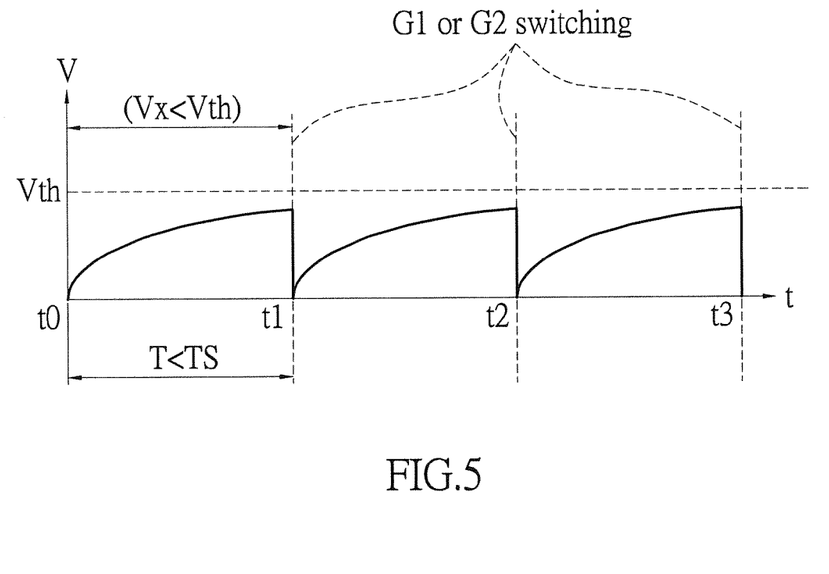
FIG. 5 is another waveform diagram of the voltage of a timing capacitor of the audible noise avoiding circuit shown in FIG. 3 when the switching frequency of the switches of the DC-DC boost converter is higher than the predetermined time interval.

When the frequency of the driver operation of the control circuit 25 for switching the first switch 22 and the second switch 24 is higher than the frequency of the sound audible by the human ear, the voltage Vx of the timing capacitor CT would not be charged to the threshold voltage Vx. Referring to FIG. 5 as an example, the timing capacitor CT is charged from the time point t0. Then, when any one of the first switching signal and the second switching signal is generated again, the voltage Vx of the time capacitor CT would drop to zero volt, referring to the time point t1 (as shown in FIG. 5 the discharge time of the timing capacitor CT is simplified as a very short time interval for convenience of explanation). Then, after the time point t1, the time capacitor CT would be charged again by the current source CS until any one of the first switching signal and the second switching signal is generated at the time point t2. In the same way, after the time point t2 the timing capacitor CT is charged again until the time point t3. In short, the time points t0, t1, t2 and t3 shown in FIG. 5 indicate the circumstances when the switching frequency of the first switch 22 and the second switch 23 is higher than the human audible sound frequency. However, FIG. 4 shows the circumstance when the frequency of switching the first switch 22 and the second switch 23 is at the human audible sound frequency. The voltage Vx of the timing capacitor CT is output to the linear regulator 292. When the voltage Vx of the timing capacitor CT reaches the threshold voltage Vth, the linear regulator 292 described in the following would reduce the voltage Vout of the output voltage node 202.

The linear regulator 292 has an operational amplifier 2921, compensation unit 2922 and a sink output stage 2923. The sink output stage 2923 can be a discharge MOSFET shown in FIG. 3, but the instant disclosure is not restricted thereto.

An inverted input terminal of the operational amplifier 2921 receives a threshold voltage Vth. A non-inverted input terminal of the operational amplifier 2921 receives the voltage Vx of the timing capacitor CT. An output terminal of the operational amplifier 2921 is coupled to the compensation unit 2922 and a control terminal of the sink output stage 2923.

In this embodiment, the linear regulator 292 further comprises a resistor R coupled with the compensating capacitor CC in series. The sink output stage 2923 is coupled to the output voltage node 202. When the voltage Vx of the timing capacitor CT is higher than the threshold voltage Vth the operational amplifier 2921 outputs a control voltage VG to the compensating unit 2922 and the control terminal (gate electrode) of sink output stage 2923. The compensation unit 2922 compensates the control voltage VG for gradually turning on the sink output stage 2923 in order to gradually reduce the voltage Vout of the output voltage node 202. In brief, the sink output stage 2923 would be gradually turned on to discharge the capacitor 23 in order to decrease the voltage Vout of the output voltage node 202. Then, based on the feedback voltage FB, the control circuit 25 would detect the output voltage Vout (regarding the feedback voltage FB) is insufficient and that the capacitor 23 needs to be supplied power. In this situation, the control circuit 25 would perform a driver operation to switch the first switch 22 and/or the second switch 24 in order to increase the voltage Vout of the output voltage node 202 (charge the capacitor 23) when the voltage Vout of the output voltage node 202 is insufficient. The switching principle of the first switch 22 and the second switch 24 utilizes conventional pulse frequency modulation technology, and thus will not be further described here. In brief, based on the operation of the control circuit 25, the control circuit 25 can be affected to turn on the first switch 22 every predetermined time interval Ts so as to keep the frequency of the switching noise greater than the frequency the human ear can hear (for example, greater than 20 kHz). As a result, referring to FIG. 2 again, the switching time interval T can be controlled to be at least shorter than the predetermined time interval Ts. The human audible noise issue can be resolved accordingly. Additionally, if the switching time interval T is shorter than the predetermined time interval Ts, the audible noise avoiding circuit 29 would not affect the operation of the DC-DC boost converter.

In other words, by time counting and switching of the audible noise avoiding circuit 29 at each predetermined time interval Ts (32 μsec), the control circuit 25 can be affected to switch the first switch 22 and the second switch 24 at every predetermined time interval Ts (32 μsec) so as to keep the frequency of the switching noise greater than 20 kHz.

To sum up the above description, the exemplary embodiment of the instant disclosure provides a DC-DC boost converter having an audible noise avoiding circuit, which detects whether the voltage at a phase node is changed during a predetermined time interval. Through the timing control, when the voltage at the phase node is not changed during the predetermined time interval, it represents a first switch and a second switch of the DC-DC boost converter are not switching (the conducting statuses are not changed) during the predetermined time interval, the audible noise avoiding circuit reduces the output voltage in order to enforce the control circuit to perform a switch operation so as to avoid generating the noise in the frequency that the human ear can hear during operation of the DC-DC boost converter. Furthermore, instead of reducing the output voltage fast which can greatly reduce the power efficiency, the audible noise avoiding circuit gradually turns on the sink output stage for reducing the output voltage when the predetermined time interval is reached.

The above-mentioned descriptions represent merely the exemplary embodiment of the instant disclosure, without any intention to limit the scope of the instant disclosure thereto.

What is claimed is:

1. An audible noise avoiding circuit, used for a DC-DC boost converter having an inductor coupled between an input voltage node and a phase node, a first switch coupled between the phase node and an output voltage node, a capacitor coupled between the output voltage node and a ground and a second switch coupled between the phase node and the ground, the audible noise avoiding circuit comprising:
    a timing controller having a timing capacitor charged by a current source, the timing controller coupled to the first control node and the second control node, the timing controller discharging the timing capacitor to a low voltage when receiving a first switching signal controlling the first switch and a second switching signal controlling the second switch; and
    a linear regulator, having a sink output stage, a compensation unit and an operational amplifier, the sink output stage coupled to the output voltage node, an inverted input terminal of the operational amplifier receiving a threshold voltage, a non-inverted input terminal of the operational amplifier receiving the voltage of the timing capacitor, an output terminal of the operational amplifier coupled to the compensation unit and a control terminal of the sink output stage, wherein when the voltage of the timing capacitor is higher than the threshold voltage the operational amplifier outputs a control voltage to the compensation unit and the control terminal of the sink output stage, the compensation unit compensates the control voltage for gradually turning on the sink output stage in order to gradually reduce the voltage of the output voltage node;
    wherein a predetermined charging time interval is defined by the time interval of charging the timing capacitor from the low voltage to the threshold voltage, the reciprocal of the predetermined time interval is a frequency in the ultrasonic wave frequency range.

2. The audible noise avoiding circuit according to claim 1, wherein the timing controller further comprises:
    a logic control unit, coupled to the first control node, the second control node and the timing capacitor, the logic control unit receiving the first switching signal and the second switching signal for discharging the timing capacitor.

3. The audible noise avoiding circuit according to claim 2, wherein the logic control unit further comprises:
    a logic inverter, receiving and inverting the first switching signal;
    a logic OR gate, coupled to the inverter, receiving the first switching signal and the inverted second switching signal; and
    a third switch, controlled by the logic OR gate for discharging the timing capacitor.

4. The audible noise avoiding circuit according to claim 1, wherein the timing control switch is an N-channel MOSFET (NMOS).

5. The audible noise avoiding circuit according to claim 1, wherein the compensation unit comprises a compensating capacitor and a resistor coupled in series.

6. The audible noise avoiding circuit according to claim 1, wherein the first switch is a P-channel MOSFET (PMOS).

7. The audible noise avoiding circuit according to claim 1, wherein the second switch is an N-channel MOSFET (NMOS).

8. The audible noise avoiding circuit according to claim 1, wherein the DC-DC boost converter further comprises:
    a voltage division unit, coupled to the output voltage node, generating the feedback voltage according to the voltage at the output voltage node.

9. A DC-DC boost converter, operating in a pulse frequency modulation mode, comprising:
    an inductor, coupled between an input voltage node and a phase node;
    a first switch, coupled between the phase node and an output voltage node;
    a capacitor, coupled between the output voltage node and a ground;
    a second switch, coupled between the phase node and the ground;
    a control circuit, transmitting a first switching signal to a first control node of the first switch and a second switching signal to a second control node of the second switch for controlling the conducting status of the first switch and the second switch according to a feedback voltage responding to the voltage at the output voltage node; and an audible noise avoiding circuit comprising:
- a timing controller having a timing capacitor charged by a current source, the timing controller coupled to the first control node and the second control node, the timing controller discharging the timing capacitor to a low voltage when receiving the first switching signal and the second switching signal; and
- a linear regulator, having a sink output stage, a compensation unit and an operational amplifier, the sink output stage coupled to the output voltage node, an inverted input terminal of the operational amplifier receiving a threshold voltage, a non-inverted input terminal of the operational amplifier receiving the voltage of the timing capacitor, an output terminal of the operational amplifier coupled to the compensation unit and a control terminal of the sink output stage, wherein with the voltage of the timing capacitor is higher than the threshold voltage the operational amplifier outputs a control voltage to the compensation unit and the control terminal of the sink output stag, the compensation unit compensates the control voltage for gradually turning on the sink output stage in order to gradually reduce the voltage of the output voltage node;

wherein a predetermined charging time interval is defined by the time interval of charging the timing capacitor from the low voltage to the threshold voltage, the reciprocal of the predetermined time interval is a frequency in the ultrasonic wave frequency range.

10. The DC-DC boost converter according to claim 9, wherein the timing controller further comprises:
- a logic control unit, coupled to the first control node, the second control node and the timing capacitor, the logic control unit receiving the first switching signal and the second switching signal for discharging the timing capacitor.

11. The DC-DC boost converter according to claim 10, wherein the logic control unit further comprises:
- a logic inverter, receiving and inverting the first switching signal;
- a logic OR gate, coupled to the inverter, receiving the first switching signal and the inverted second switching signal; and
- a third switch, controlled by the logic OR gate for discharging the timing capacitor.

12. The DC-DC boost converter according to claim 9, wherein the timing control switch is an N-channel MOSFET (NMOS).

13. The DC-DC boost converter according to claim 9, wherein the compensation unit comprises a compensating capacitor and a resistor coupled in series.

14. The DC-DC boost converter according to claim 9, wherein the first switch is a P-channel MOSFET (PMOS).

15. The DC-DC boost converter according to claim 9, wherein the second switch is an N-channel MOSFET (NMOS).

16. The DC-DC boost converter according to claim 9, further comprising:
- a voltage division unit, coupled to the output voltage node, generating the feedback voltage according to the voltage at the output voltage node.

* * * * *